No. 767,399. PATENTED AUG. 16, 1904.
S. FORTER.
FEEDING DEVICE FOR GAS PRODUCERS, FURNACES, OR THE LIKE.
APPLICATION FILED AUG. 17, 1903.
NO MODEL. 6 SHEETS—SHEET 3.
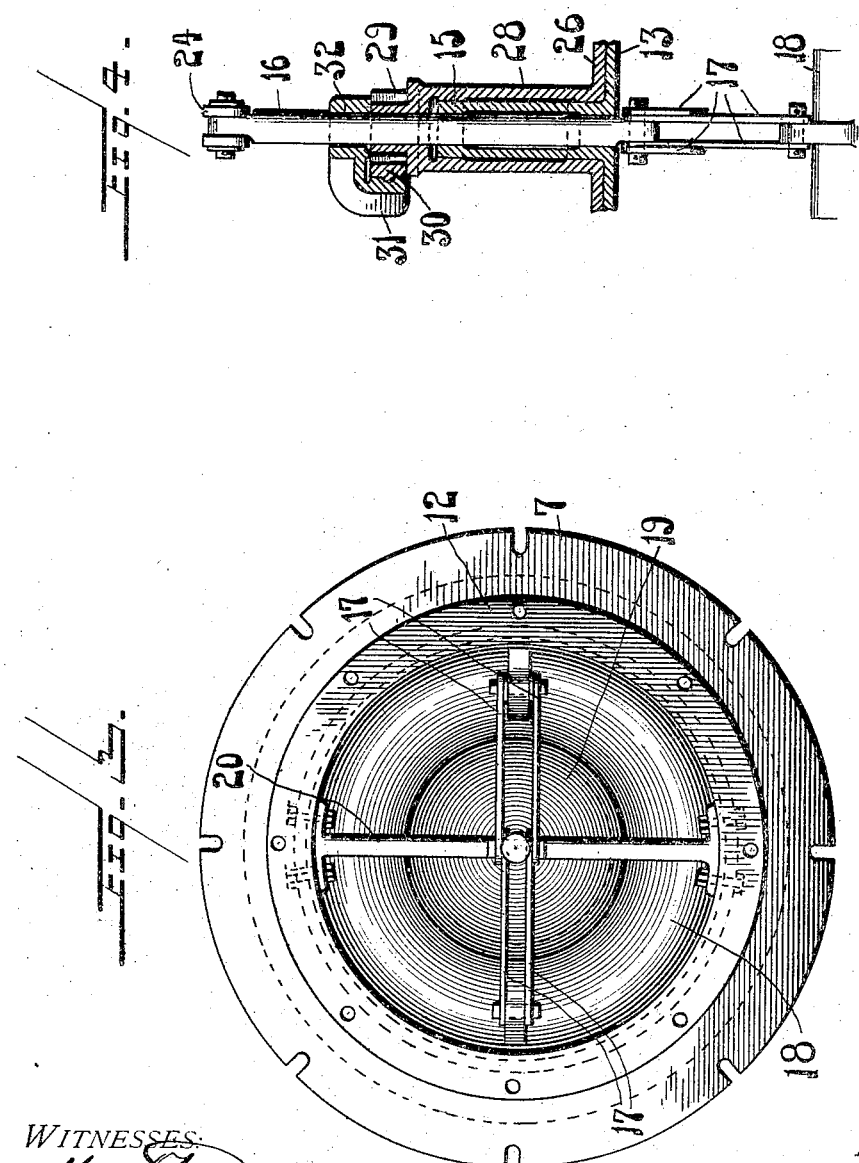

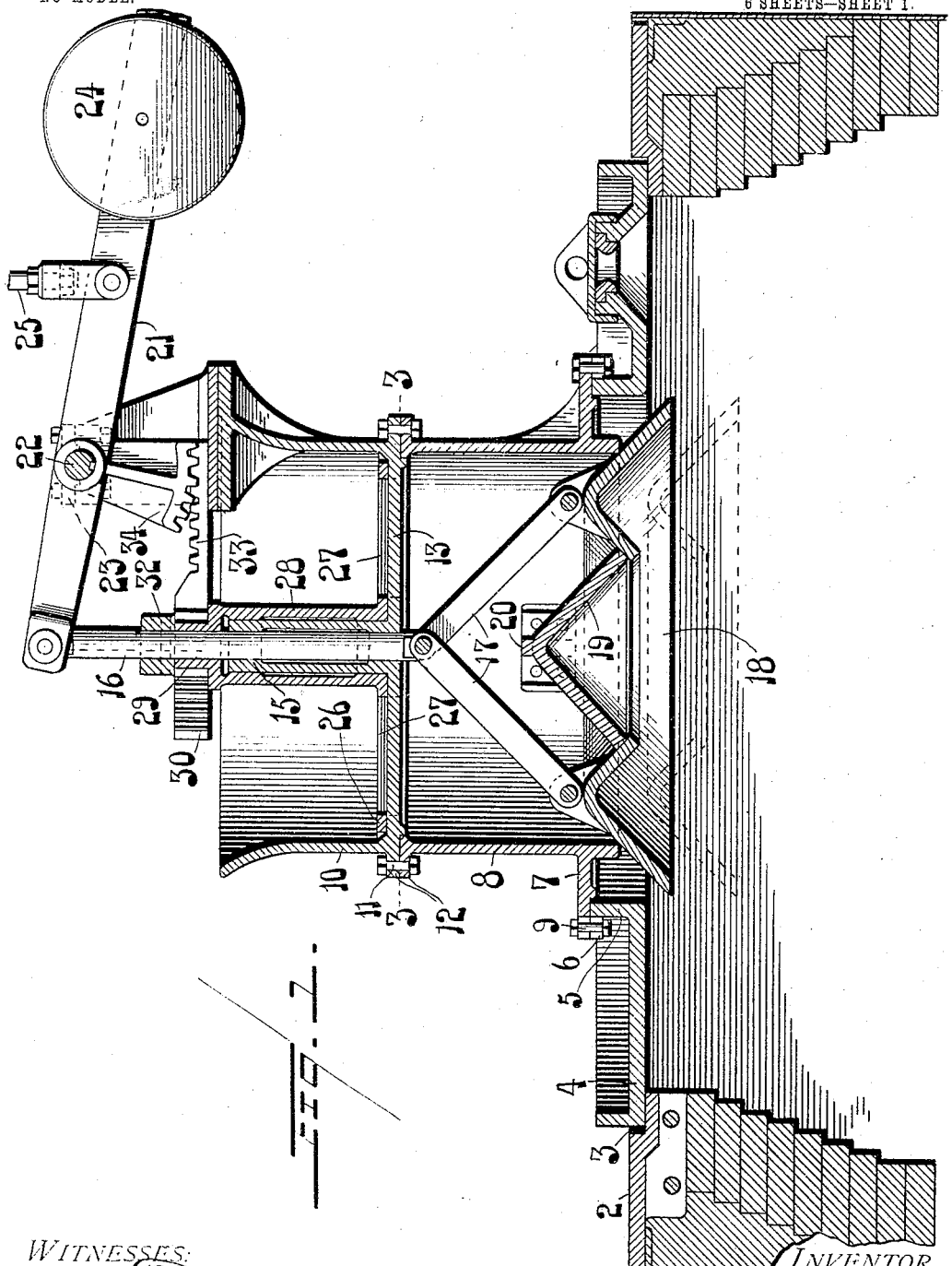

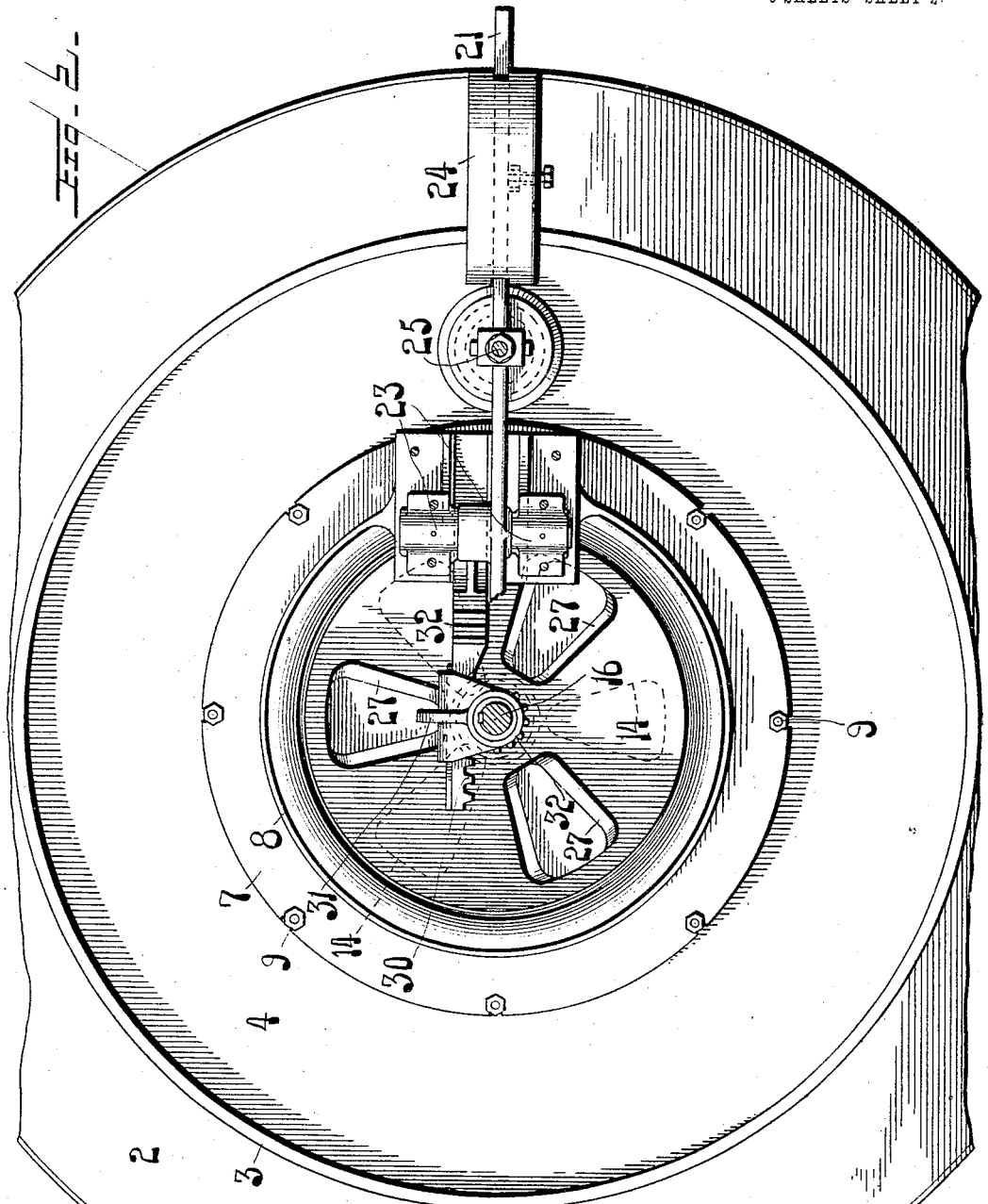

No. 767,399. PATENTED AUG. 16, 1904.
S. FORTER.
FEEDING DEVICE FOR GAS PRODUCERS, FURNACES, OR THE LIKE.
APPLICATION FILED AUG. 17, 1903.
NO MODEL. 6 SHEETS—SHEET 4.
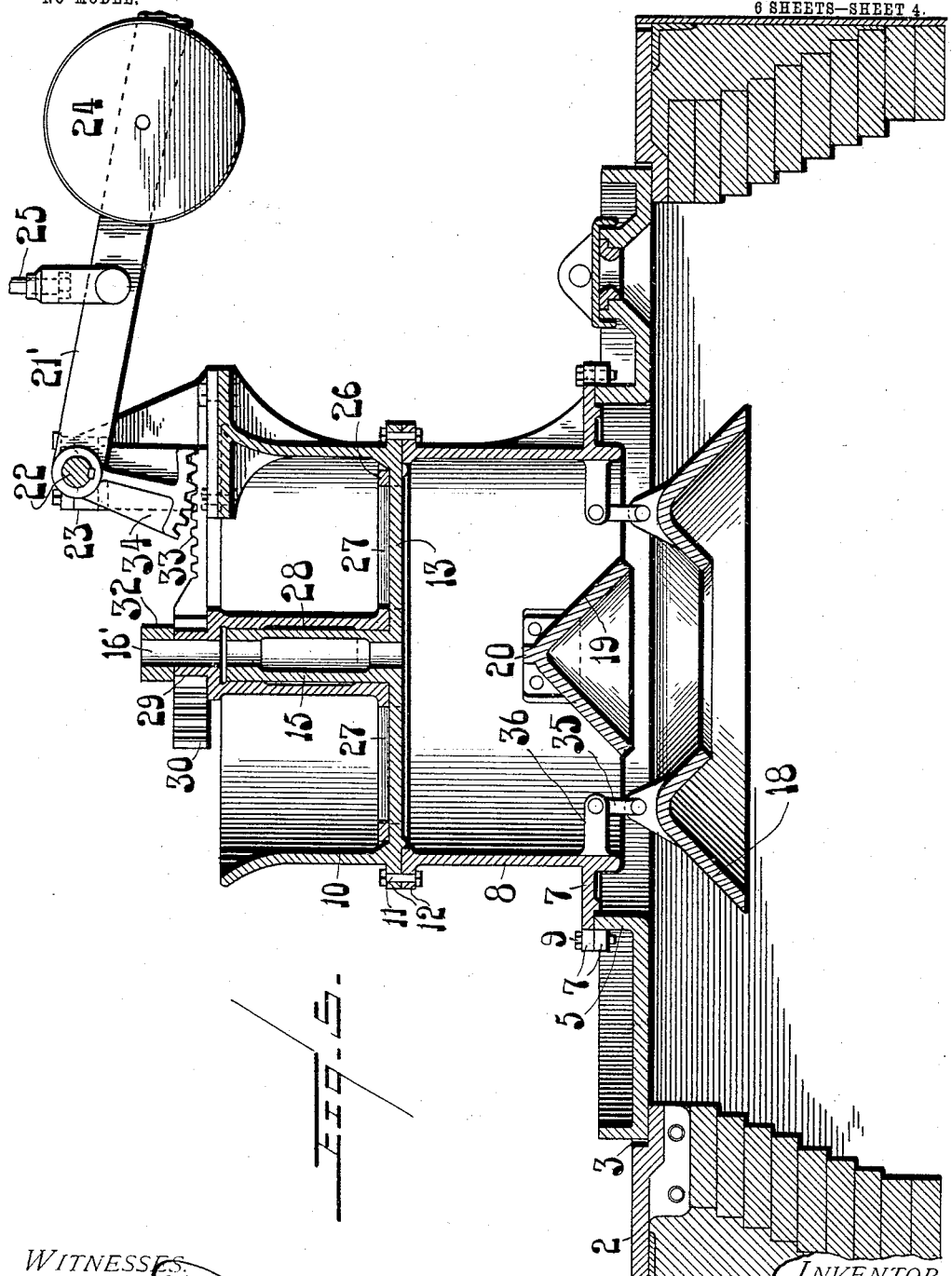
WITNESSES
W. F. Doyle
F. N. Barber
INVENTOR
Samuel Forter,
BY Wm. L. Pierce,
Attorney

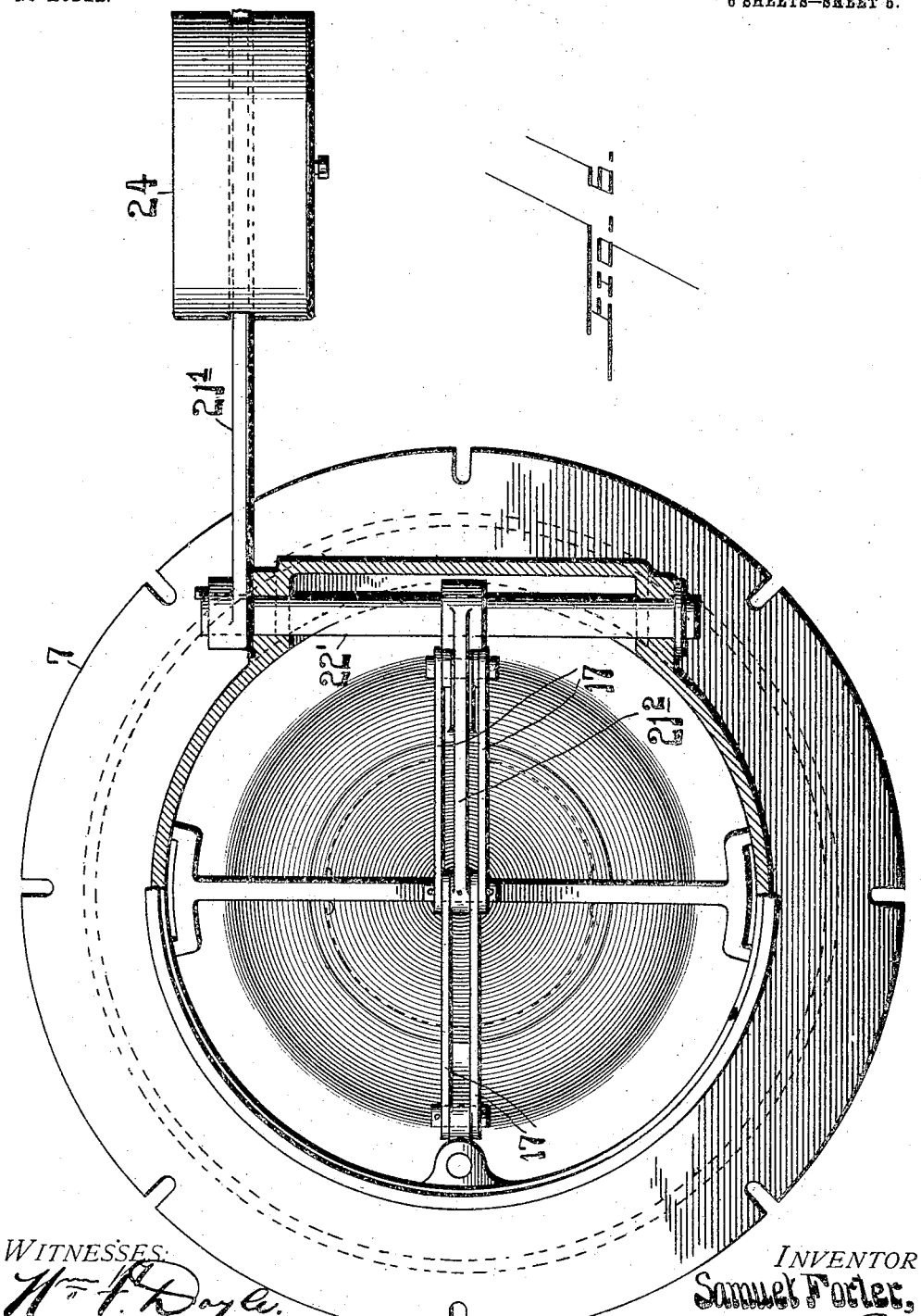

No. 767,399. PATENTED AUG. 16, 1904.
S. FORTER.
FEEDING DEVICE FOR GAS PRODUCERS, FURNACES, OR THE LIKE.
APPLICATION FILED AUG. 17, 1903.
NO MODEL. 6 SHEETS—SHEET 6.
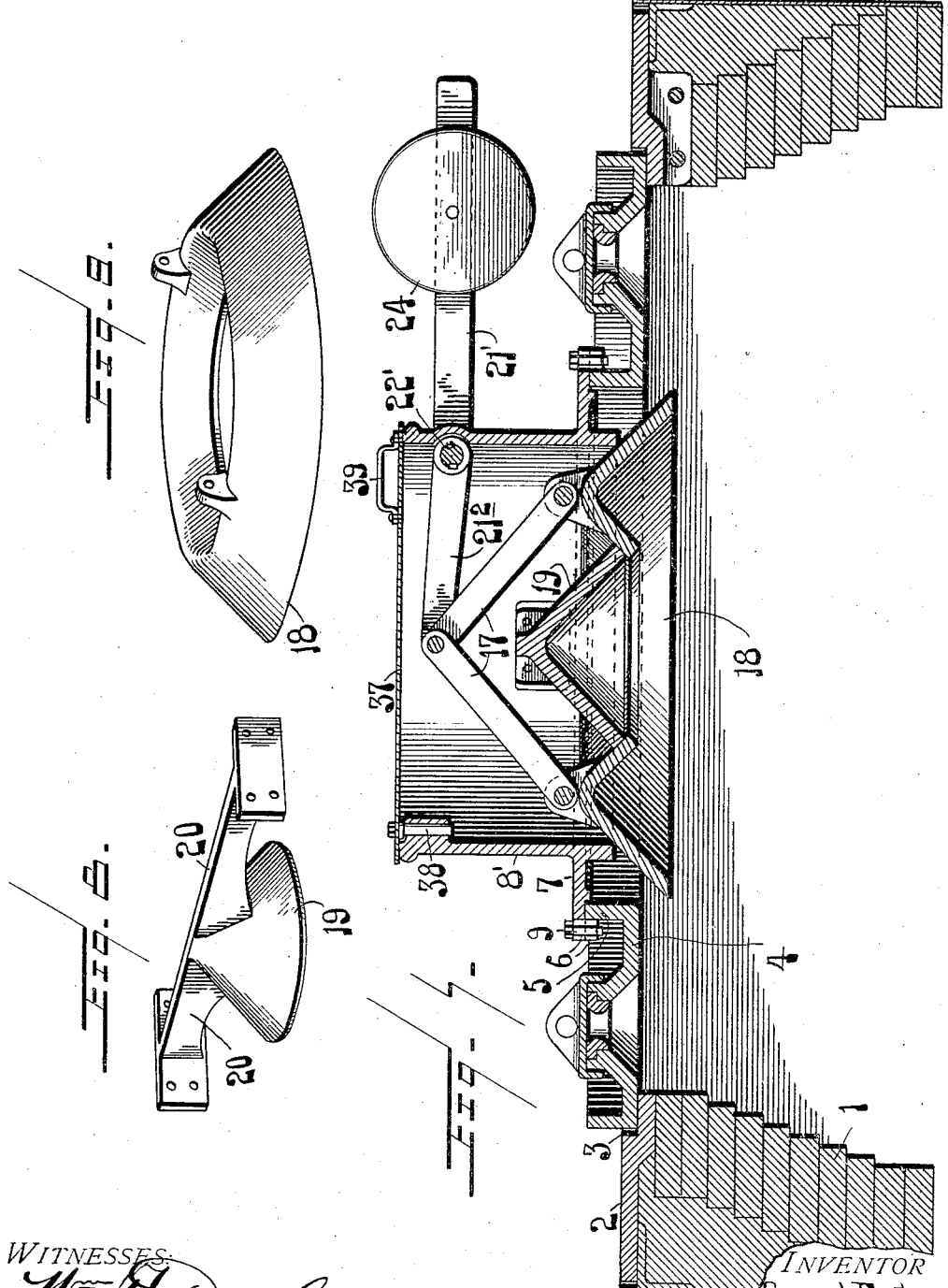

No. 767,399.                                                     Patented August 16, 1904.

UNITED STATES PATENT OFFICE.

SAMUEL FORTER, OF PITTSBURG, PENNSYLVANIA, ASSIGNOR TO FORTER-MILLER ENGINEERING COMPANY, A CORPORATION OF PENNSYLVANIA.

FEEDING DEVICE FOR GAS-PRODUCERS, FURNACES, OR THE LIKE.

SPECIFICATION forming part of Letters Patent No. 767,399, dated August 16, 1904.

Application filed August 17, 1903.  Serial No. 169,737.  (No model.)

*To all whom it may concern:*

Be it known that I, SAMUEL FORTER, a citizen of the United States, residing at Pittsburg, in the county of Allegheny and State of Pennsylvania, have invented or discovered new and useful Improvements in Feeding Devices for Gas-Producers, Furnaces, or the Like, of which the following is a specification.

My invention relates to mechanism for feeding material to gas-producers and the like.

It is the object thereof to provide a novel feeding mechanism which will distribute the charges for gas-producers, blast-furnaces, and the like so that they shall be directed both toward the center and the sides.

It is a further object thereof to provide a novel means for operating the gates which permit the said material to drop.

Figure 1 is a vertical section of the upper part of a gas-producer. Fig. 2 is a plan thereof. Fig. 3 is a section on the line 3 3 of Fig. 1. Fig. 4 is view, partly in vertical section and partly in elevation, showing the door-operating mechanism at a right angle to its position in Fig. 1. Fig. 5 is a vertical section showing another form of my invention. Fig. 6 is a plan view, partly in horizontal section, of still another form of my invention. Fig. 7 is a vertical section of the same, showing the upper part of a gas-producer. Fig. 8 is a detail perspective of the cone shown in the several views. Fig. 9 is a similar view of the movable bell shown in the several views.

Referring to the drawings, 1 designates the upper portion of the wall of a gas-producer, and 2 is an annular plate on the top thereof, secured thereto in any well-known manner. The plate 2 has an annular recess 3, in which is seated the smaller annular plate 4, having the upstanding neck 5, provided with an outwardly-extending annular flange 6, to which the horizontal flange 7 of the lower drum 8 is fastened by the bolts 9. The drum 8 supports the upper drum 10, the drums being secured together by bolts 11, passing through flanges 12 of the drums.

The drum 10 has a bottom 13, provided with openings 14, arranged around the center thereof. The bottom has secured thereto, preferably integral therewith, a hollow vertical bearing 15, within which is the rod 16, connected through the links 17 to the annular bell 18, whose outer inclined side closes against the bottom of the drum 8 and whose inner inclined side closes against the bottom of the stationary cone 19, secured to arms 20, (see Fig. 8,) riveted to the inner side of the said drum.

A lever 21 is secured to the rock-shaft 22, having bearings in the journal-boxes 23 on the top of the drum 10, and has its inner end connected to the rod 16 and its outer end provided with an adjustable weight 24. The lever is operated by the rod 25, pivotally secured thereto and connected to any suitable operating mechanism. (Not shown.)

Resting on the upper side of the bottom 13 is a rotary plate or gate 26, having openings 27, capable in one position of registering with the openings 14 in the bottom 13 and in another position of being out of registry therewith. The gate 26 has a vertical tubular bearing 28, which fits externally the bearing 15 and carries at its upper end a pinion 29, in mesh with the horizontal rack-bar 30, held in place by the angle-arm 31, carried by the collar 32 above the pinion. The rack-bar 30 has also a rack 33, which meshes with the segmental rack 34, secured to the rock-shaft 22.

The parts being as shown in Figs. 1 and 2, material for producing gas is dropped into the drum 10. The rod 25 is then raised, causing the gate to rotate in an obvious manner, so that the openings 14 and 27 register and permit the said material to fall into the drum 8. The same movement of the rod 25 causes the bell 18 to be lowered, so that the material which falls through the openings 14 and 27 immediately passes into the producer or furnace, a part of the material going toward the center and a part toward the side, the cone 19 aiding to make the distribution even, as is clear. A reverse movement of the rod 25 restores the parts to their normal position, as shown in Figs. 1 and 2.

In Fig. 5 the rod 16' is not reciprocatory or fastened to the lever 21', and the bell 18 is not movable, but is suspended a short distance below the drum 8 by links 35', connected at one end to the bell and at the other end to lugs 36, extending into the drum 8. The operation is the same as in Fig. 1, except that the material after dropping below drum 10 drops onto a stationary annular bell. The rod 25 operates the gate 26 only.

In Figs. 6 and 7 the lower drum 8' only is used, which has a cover 37, hinged to the bolt 38 and provided with the handle 39. The rock-shaft 22' carries an arm 21', which supports the weight 24 and an arm 21², which is attached to the links 17.

The operation is as follows: The parts being as shown in Fig. 7, the cover 37 is swung aside and a furnace charge dumped in the drum 8'. The cover is closed, and the arm 21' is raised to lower the bell 18, whereby the charge is dropped into the furnace and distributed, as in the other forms of my invention.

I do not desire to be restricted to the precise details shown and described, but desire to include all structures which fairly come within the scope thereof.

I do not desire to be limited in the use of my invention to gas-producers, as the same has plainly a wider use.

Having described my invention, I claim—

1. In a feeding device for gas-producers and the like, an upper drum, a lower drum, a bell for closing one drum and a rotary gate for closing the other drum, and means for operating said bell and gate simultaneously.

2. In a feeding device for gas-producers and the like, an upper drum, a lower drum fixedly secured to the upper drum, a bell for closing the lower drum, a gate for closing the upper drum, and means for simultaneously opening the bell and the gate.

3. In a feeding device for gas-producers and the like, a drum having a bottom with discharge-openings therein, a rotary gate having means for opening and closing said openings, a pinion connected with said gate, a bar having teeth meshing with said pinion, a segmental rack meshing with teeth on said bar and adapted to operate the same, and means for operating the segmental rack.

4. In a feeding device for gas-producers and the like, two drums separated by a slotted partition, a bell for the lower drum and a rotary perforated gate for the upper drum, and a lever arranged to operate the bell and gate.

Signed at Pittsburg, Pennsylvania, this 5th day of August, 1903.

SAMUEL FORTER.

Witnesses:
F. N. BARBER,
A. M. STEEN.